(No Model.)
F. GREEN.
CORN PLANTING ATTACHMENT FOR PLOWS.
No. 455,922. Patented July 14, 1891.
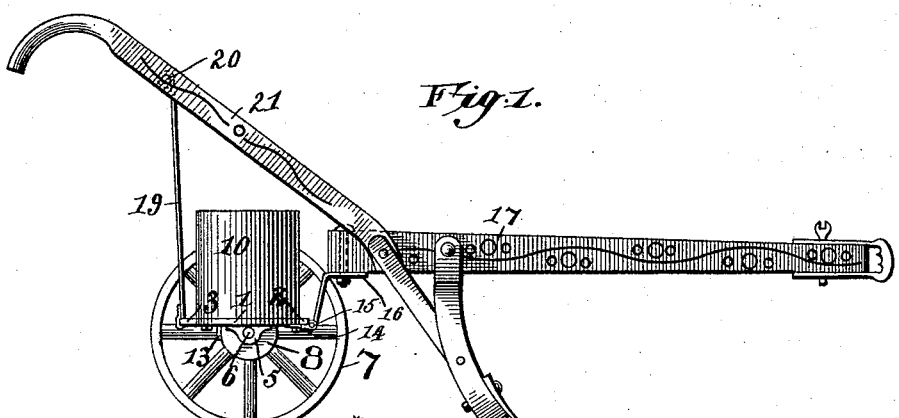
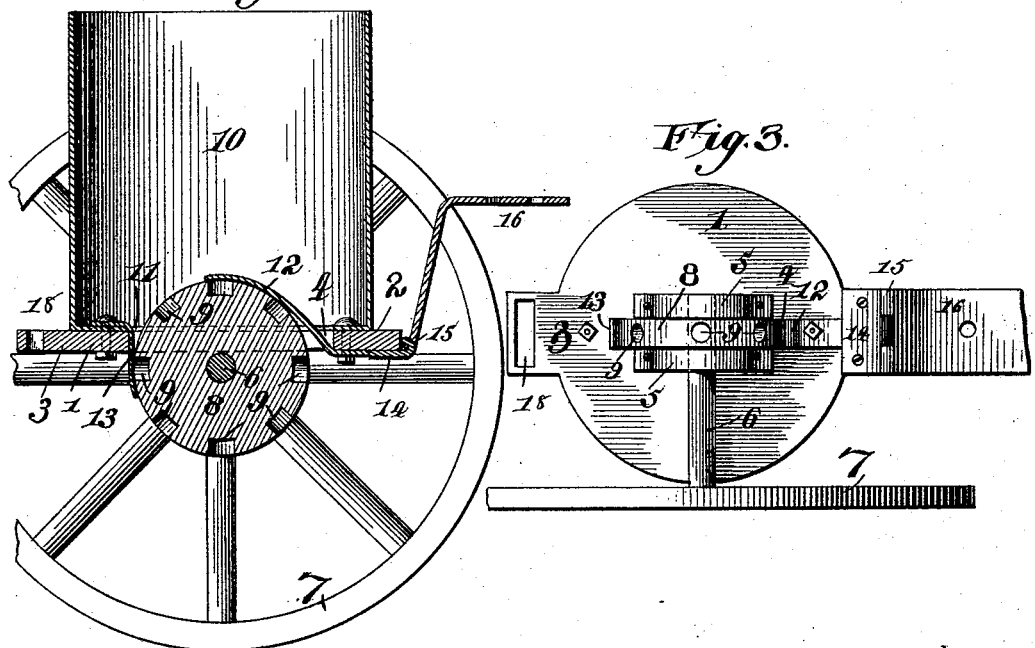
Witnesses
H. G. Dieterich,
Wm. Bagger
Inventor
Frank Green,
By his Attorneys,
C. A. Snow & Co.

UNITED STATES PATENT OFFICE.

FRANK GREEN, OF PEORIA, TEXAS.

CORN-PLANTING ATTACHMENT FOR PLOWS.

SPECIFICATION forming part of Letters Patent No. 455,922, dated July 14, 1891.

Application filed September 9, 1890. Serial No. 364,431. (No model.)

*To all whom it may concern:*

Be it known that I, FRANK GREEN, a citizen of the United States, residing at Peoria, in the county of Hill and State of Texas, have invented a new and useful Corn-Planting Attachment for Plows, of which the following is a specification.

This invention relates to corn-planting attachments for plows; and it has for its object to provide a simple and inexpensive seed-dropping device which may be conveniently attached to any plow or furrow-opener of ordinary construction, and which shall be efficient in operation and capable of being thrown into or out of operation, as may be desired.

The invention consists in the improved construction, arrangement, and combination of parts, which will be hereinafter fully described, and particularly pointed out in the claim.

In the drawings hereto annexed, Figure 1 is a side elevation showing my improved corn-planting device attached to an ordinary plow in position for operation. Fig. 2 is a longitudinal sectional view of the corn-planting attachment detached from the plow. Fig. 3 is a bottom plan view of the same.

Like numerals of reference indicate like parts in all the figures.

1 designates a circular plate, which is provided on diametrically-opposite sides at its front and rear ends with lugs or projections 2 and 3. Said plate is also provided with a longitudinal slot 4, at the sides of which are formed boxes or bearings 5 5 for a transverse shaft 6, the outer end of which carries a wheel 7, adapted to bear against the ground. The shaft 6 also carries a seed-disk 8, which extends through the slot 4, and the periphery of which is provided with recesses 9, forming the seed-cups. These recesses or seed-cups may be of any desired size, and means may, if desired, be provided for regulating their capacity.

Suitably mounted upon the upper side of the plate 1 is a circular box or hopper 10, the bottom of which has a slot 11 registering with the slot 4 in the bottom plate. To the under side of the latter, near its front end, is secured a cut-off spring 12, which extends upward and rearwardly through the slots 4 and 11 and bears against the periphery of the seed-disk. Another spring 13, likewise bearing against the periphery of the seed-disk, is secured in the bottom of the hopper, near the rear end of the slot 11, through which it extends in a downward direction.

To the under side of the lug 2, at the front end of plate 1, is secured one of the leaves 14 of a hinge 15, the other leaf of which 16 is angular or L-shaped and is adapted to be secured by means of screws, bolts, or the like to the rear end of a plow-beam 17. The lug 3, at the rear end of plate 1, has a slot 18 for the attachment of a strap 19, which may be made fast to the rung 20, connecting the handles 21 of the plow, to which the device is attached for operation.

My improved corn-planting attachment may, as will be readily understood, be attached or secured to the beam of any plow of ordinary construction. When the plow progresses over the field, the supporting-wheel 7 will bear against the surface of the ground, causing the shaft 6 to rotate with the seed-disk 8, which latter discharges the contents of the hopper. A spout may be provided to convey the seed to the furrow; but this is not essential. The operation may be suspended at any time by raising the rear end of the device sufficiently to raise the wheel 7 from contact with the ground, the hinge 15 enabling the attachment to be thus raised. The device may be retained in a raised or inoperative position by making the strap 19 fast to the rung 20.

The general construction of the device is simple and inexpensive, and the seed-dropping mechanism is certain and efficient in operation.

Having thus described my invention, I claim—

In a device of the class described, the combination of the base-plate 1, having lugs 2 3, slot 4, and boxes 5, the superimposed seed-box 10, having bottom slot 11, the shaft 6, having seed-disk 8 and wheel 7, the springs 12 13, and the hinge 15, secured to the lug 2 and having an angular leaf 16 attached to the rear end of a plow-beam, all constructed and arranged substantially as and for the purpose set forth.

In testimony that I claim the foregoing as my own I have hereto affixed my signature in presence of two witnesses.

FRANK GREEN.

Witnesses:
G. W. PAGE,
R. R. HOOKER.